United States Patent
Tsuda et al.

[15] 3,671,468
[45] June 20, 1972

[54] POLYMERS AND PROCESS FOR PREPARING THE SAME

[72] Inventors: Minoru Tsuda, Kita-adachi-gun; Akio Yosida; Takamitsu Yuki, both of Tokyo, all of Japan

[73] Assignee: Chugai Seiyaku Kabushiki Kaisha, Tokyo, Japan

[22] Filed: Sept. 3, 1970

[21] Appl. No.: 69,231

[30] Foreign Application Priority Data

Sept. 4, 1969 Japan..................................44/69709

[52] U.S. Cl............................260/2 R, 210/54, 260/29.2 N, 424/78
[51] Int. Cl.........................................................C08g 33/02
[58] Field of Search ....................................260/2 R

[56] References Cited

UNITED STATES PATENTS

| | | | |
|---|---|---|---|
| 2,261,002 | 10/1941 | Ritter............................ | 260/2 |
| 2,807,910 | 10/1957 | Erickson........................ | 260/2 |
| 3,265,734 | 8/1966 | Kraiman et al. ............... | 260/2 |

Primary Examiner—Samuel H. Blech
Attorney—Browdy and Neimark

[57] ABSTRACT

Novel polymers represented by the formula

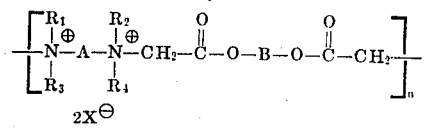

$2X^{\ominus}$ where A and B are each selected from the group consisting of a straight and branched alkylene, a straight and branched alkylene containing, as a part thereof, a double bond, a triple bond or a radical $-(CH_2CH_2O)_y-CH_2-CH_2-$ wherein $y$ is an integer of from 1 to 20, xylylene and cyclohexylene; $R_1$, $R_2$, $R_3$ and $R_4$ represent a lower alkyl group, or $R_1$ and $R_2$, and/or $R_3$ and $R_4$, when taken together with the nitrogen atoms to which they are attached, may form heterocyclic rings; and X represents a halogen atom, which are useful for pharmaceutical preparations and useful as a coagulating or flocculating agent for clarifying crude water in the reservoir for water supply, industrial water and sewage or drainage water are disclosed. The polymers are prepared by reacting a compound represented by the formula

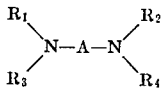

wherein $R_1$, $R_2$, $R_3$, $R_4$ and A are as defined above, with a compound represented by the formula

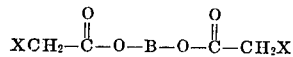

wherein B and X are as defined above.

19 Claims, 1 Drawing Figure

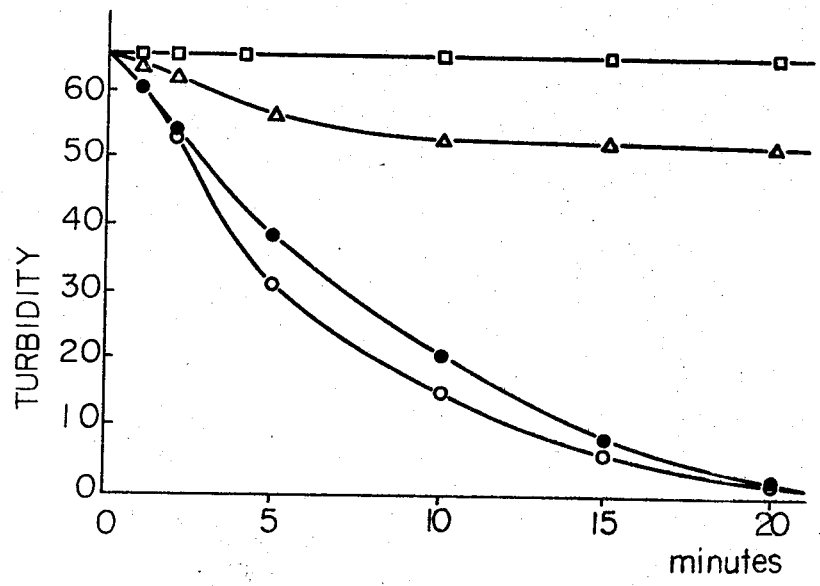

POLYMERS AND PROCESS FOR PREPARING THE SAME

This invention relates to novel polymers represented by the formula

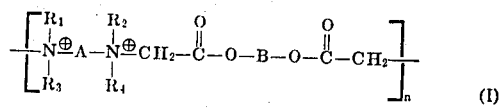
(I)

where A and B are each selected from the group consisting of a straight and branched alkylene radical, a straight and branched alkylene radical containing, as a port thereof, a double bond, a triple bond or a radical $-(CH_2CH_2O)_y-CH_2-CH_2$ wherein $y$ is an integer of from 1 to 20, xylylene and cyclohexylene; $R_1$, $R_2$, $R_3$, and $R_4$ represent a lower alkyl group; or $R_1$ and $R_2$, and/or $R_3$ and $R_4$, when taken together with the nitrogen atoms to which they are attached, may form heterocyclic rings; $n$ is an integer of from 20 to 50 and X represents a halogen atom; and to a process for preparing the same.

The polymers of this invention are useful for pharmaceutical preparations. Also, because of their activities as a coagulating or flocculating agent, they can be used beneficially for a wide variety of treatments such as for clarifying crude water in the reservoir for water supply, industrial water and sewage or drainage water.

In accordance with the present invention, a novel polymer (I) can be prepared by reacting a compound represented by the formula (II)

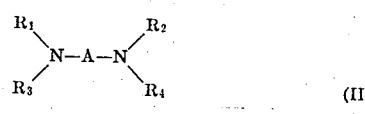
(II)

Wherein A, $R_1$, $R_2$, $R_3$ and $R_4$ are as defined above, with a bis-(haloacetyl) glycol represented by the formula (III)

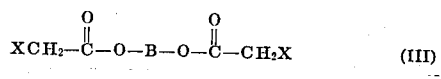
(III)

wherein B and X are as defined above.

In the recurring unit represented by the above formula (I), the symbol $n$ refers to a positive integer which may be up to several tens, preferably about 20 to about 50. For example, the compound of the formula (I) wherein A is $-(CH_2)_2-$; B is $-(CH_2)_2-$; $R_1$, $R_2$, $R_3$ and $R_4$ each represents methyl; and X is chlorine has been found to have a molecular weight of approximately 9,800 as determined by the light-scattering measurements, and this molecular weight indicates that the above polymer has the degree of polymerization of about 20 ($n=20$). However, it is to be understood that the degree of polymerization in the polymers of this invention can be lower or higher values within the range up to several tens order depending upon the suitable selections of the reaction conditions and the reactants used in the polymerization and, therefore, is not limited to the above value.

The starting material (II) used in the present invention may be any one of the tertiary diamines and includes, for example, 1,4-dimethylpiperazine, triethylenediamine, N,N,N',N'-tetramethylethylenediamine, N,N,N',N'-tetramethylpropylenediamine, N,N,N',N'-tetramethylhexamethylenediamine, N,N,N',N'-tetramethyl-xylylenediamine and the like.

Another starting material (III) used in the present invention can be obtained by the reaction of monohaloacetic acid with an appropriate glycol and includes, for example, bis(chloroacetyl)ethylene glycol, bis(chloroacetyl)-1,4-butanediol, bis(chloroacetyl)-1,3-propanediol, bis(chloroacetyl)-1,10-decanediol, bis(chloroacetyl)-cyclohexanediol, bis(chloroacetyl)-xylene glycol, bis(chloroacetyl)butendiol, bis(chloro-acetyl)butyndiol, bis(chloroacetyl)polyethylene glycol and the like.

In carrying out the process of this invention, the starting compounds (II) and (III) are preferably reacted in equimolar proportions so that the reaction proceeds smoothly and provides the desired product in high degree of polymerization and in high yield. The product can generally be obtained in good yield when the reaction is carried out by dissolving the starting compounds (II) and (III) in an organic solvent such as lower alkanols, benzene, acetone, cyclohexane, tetrahydrofuran, dimethylformamide, chloroform, dichloroethane, toluene, xylene or a mixture thereof and stirring the solution at a temperature between 0° C and a refluxing temperature.

The starting material [bis-(halo-acetyl)glycols] used in the present invention is extremely reactive because of the halogen atoms adjacent ($\alpha$-positions) to the carbonyls

and results in a high yield of the products having high degree of polymerization through a polymerizing reaction under mild conditions. This fact makes it possible to utilize, as a halogen, a less reactive chlorine in place of iodine or bromine which is more reactive than the other halogens and which has generally been the halogen of choice in the conventional quaternarizing reaction even though the use of iodine or bromine has disadvantages in handling and cost. It is therefore one of the outstanding features of the present invention that, by utilizing chlorine which is easily available and handled, the desired products of high degree of polymerization can be obtained without the risk which is accompanied with the use of iodine or bromine.

The polymer (I) of the present invention is a novel water-soluble cationic polyelectrolyte having a high molecular weight and containing quaternary ammonium salts in the main chain of the molecule.

One characteristic of this polyelectrolyte is that, when it is added to turbid sewage or drainage water in relatively small amounts, the water is clarified by, unlike the conventional nonionic or anionic polyelectrolyte, neutralizing the negative zeta-potential of microparticles suspended therein thereby flocculating and sedimenting the particles, and that this polyelectrolyte can effectively be used for such a purpose over the wide range of pH value because it will not be in an insoluble state over that pH value.

In the drawings,

The FIGURE is a graph showing the aggregating effect of the polymer of this invention as compared with those obtained by using conventional aggregating agents and the control where no aggregating agent is added.

The present invention is further illustrated by the following experiments showing the beneficial effects of the polymers and examples showing some embodiments for the preparation of the polymers but these are not to be construed as limiting the scope of the invention.

EXPERIMENT 1

0.1 g of crystalline sericite, the particles being 2 microns or less in diameter, was added to 1 liter of water and vigorously agitated. The resulting suspension was found to be stable and had not cleared after being allowed to stand for 1 week. 0.8 mg of the polymer prepared as in Example 4 below was then added to 100 ml of the thus obtained stable suspension, and the mixture was thoroughly stirred with a magnetic stirrer, and thereafter the changes in turbidity of the suspension with the elapse of time were determined with a turbidimeter. The same procedure was followed using aluminum sulfate or sodium alginate as a coagulating agent in place of the polymer used above, and also with a control where no coagulating agent was added. The results obtained are shown in the FIGURE.

In the FIGURE, □ indicates the curve for the control in which no coagulating agent was added, △ indicates the curve where sodium alginate was added at a level of 10 p.p.m.; ● indicates the curve where aluminum sulfate was added at a level of 180 p.p.m.; and ○ indicates the curve where the polymer of Example 4 was added at a level of 8 p.p.m. In all cases, the turbidity was determined on suspension having a pH 6.8.

EXPERIMENT 2

Crystalline sericite which has been granulated into particles of from $10\mu$ to $40\mu$ in diameter generally tends to spontaneously sediment when it is suspended in water at a level of 1 to 3 percent or more since the movement of the particles is suppressed by the strong mutual interference between the particles or the aggregates thereof thereby forming in the suspension a sharp concentration gradient which, in turn, gives a boundary layer between the supernatant and the sedimented particles or aggregates. This phenomenon, however, occurs at extremely slow rate when the concentration in the suspension is less than about 0.5 percent.

It was found that the addition of each of the compounds prepared in Examples 4, 9, 17 and 19 to such a stable suspension which does not spontaneously sediment promotes effectively the sedimentation of the particles suspended therein. The results are shown in Table 1.

TABLE 1

| Additive | Concentration (p.p.m.) | Sedimentation rate (cm./min.) | Turbidity of supernatant after 30 minutes standing |
|---|---|---|---|
| Polymer of Example 4 | 2 | 6 | 2 |
| Polymer of Example 9 | 3 | 6 | 2 |
| Polymer of Example 17 | 4 | 5 | 2 |
| Polymer of Example 19 | 5 | 7 | 2 |
| Sodium alginate | 5 | 9 | 17 |
| Aluminum sulfate | 50 | 3 | 2 |
| None | | 0 | (¹) |

¹ No boundary layer was formed.

PROCEDURE FOR MEASUREMENT

A 0.3 percent suspension of sericite was taken in a measuring cylinder of 2.8 cm inner diameter 23 cm height, and each of the above additives was added to the suspension at a concentration indicated above. The total volume was then made up to 100 ml and the cylinder was reversed 20 times at constant rate followed by being allowed to stand. After 30 minutes' standing, 10 ml of the supernatant was taken out and the turbidity of the supernatant was determined with a turbidimeter.

EXPERIMENT 3

A 0.1 percent aqueous suspension of sericite, the particles being $10\mu$ to $40\mu$ in diameter, having dissolved therein 100 p.p.m. of sodium laurylbenzene sulfonate is very stable and the sedimention of sericite occurs at extremely slow rate.

It was found that the addition of the polymer prepared in Example 13 below to the above suspension in an amount corresponding to 28 p.p.m. remarkably promotes the aggregation and the sedimentation of the particles and that the quantitatively determined amount of lauryl-benzene sulfonic acid contained in the supernatant is reduced to approximately 30 percent as compared with that of the control where no polymer was added.

Also, the addition of the polymer prepared in Example 13 to a 100 p.p.m. aqueous solution of sodium laurylbenzene sulfonate in an amount corresponding to 30 p.p.m. caused a white precipitate of the sulfonate and the solution was found to be substantially purified water containing small amount of sodium laurylbenzene sulfonate.

EXAMPLE 1

To a solution of 11.5 g of 1,4-dimethylpiperazine dissolved in 100 ml of benzene was added 25.5 g of bis-(chloroacetyl)-ethylene-glycol and the mixture was heated at reflux while stirring. After about 10 minutes, a white viscous material began to precipitate and the stirring became more difficult because of the increased viscosity. The reaction completed for about 30 minutes. After cooling, the resulting precipitate was separated from the solvent and dissolved in methanol, and the methanolic solution was added dropwise to ether thereby reprecipitating the product. The thus obtained purified product was a white, strongly hygroscopic high molecular weight polymer; yield, 25.5 g; $[\eta]= 0.095$.

EXAMPLE 2

17.2 g of N,N,N',N'-tetramethylethylenediamine and 24.3 g of bis(chloroacetyl)-1,4-butanediol were dissolved in 200 ml of benzene and the solution was stirred vigorously at room temperature. After 30 minutes' stirring, a semi-transparent, viscous material began to deposit on the wall of the reactor. After being allowed to react for about 3 hours, the precipitated reaction product was separated from the solvent, washed with 200 ml of benzene and then dried under reduced pressure to give 33 g of a strongly hygroscopic, white polymer; $[\eta]= 0.11$.

EXAMPLES 3 to 23

In the same manner as described in Examples 1 and 2, the polymers listed in Table 2 below were prepared from the reactants indicated.

We claim:
1. A novel polymer represented by the formula:

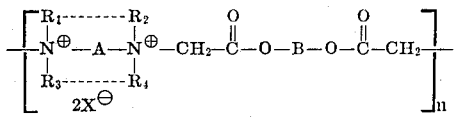

wherein $R_1$, $R_2$, $R_3$ and $R_4$, when taken individually, each represents a lower alkyl group, and A is selected from the group consisting of a straight alkylene chain and xylylene; or $R_1$, $R_2$, $R_3$, $R_4$ and A, when taken together with the nitrogen atoms, represent a member selected from the group consisting of

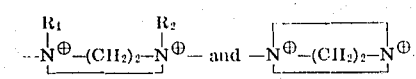

wherein $R_1$ and $R_2$ each represents a lower alkyl group; B is selected from the group consisting of a straight alkylene chain, a straight alkylene chain containing as a part thereof, a double bond or a triple bond, a branched alkylene chain, cyclohexylene, xylylene and $(CH_2CH_2O)_yCH_2CH_2—$ in which $y$ is an integer of from 1 to 20; X is a halogen atom; and $n$ is an integer of from 20 to 50.

2. A novel polymer in accordance with claim 1, represented by the formula

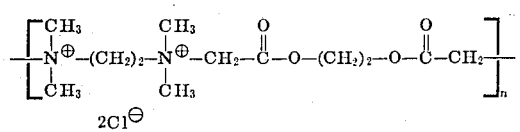

3. A novel polymer in accordance with claim 1, represented by the formula

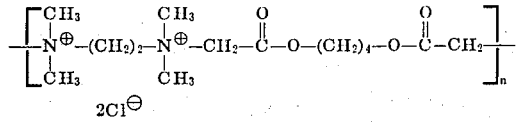

TABLE 2

| Example number | Starting compound (II) | | | | Starting compound (III) | | | Reaction conditions | | | Product | |
|---|---|---|---|---|---|---|---|---|---|---|---|---|
| | A | $R_1$ | $R_2$ | $R_3$ | $R_4$ | B | X | Solvent | Temperature (°C.) | Time (hr.) | Intrinsic viscosity $(\eta)$ 100 ml./g. | Properties |
| 3 | $(CH_2)_2$ | $CH_3$ | $CH_3$ | $CH_3$ | $CH_3$ | $(CH_2)_2$ | Cl | $C_6H_6$ | R.T.[1] | 24 | [2] 0.07 | White hygroscopic powder. |
| 4 | $(CH_2)_2$ | $CH_3$ | $CH_3$ | $CH_3$ | $CH_3$ | $(CH_2)_2$ | Cl | $ClCH_2CH_2Cl$ | R.T. plus reflux | 2+0.5 | 0.09 | Do. |
| 5 | $(CH_2)_2$ | $CH_3$ | $CH_3$ | $CH_3$ | $CH_3$ | $(CH_2)_4$ | Cl | $C_6H_5$ | Reflux | 0.5 | 0.10 | Do. |
| 6 | $(CH_2)_2$ | $CH_3$ | $CH_3$ | $CH_3$ | $CH_3$ | $(CH_2)_4$ | Cl | 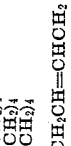 | do | 1 | 0.09 | Do. |
| 7 | $(CH_2)_2$ | $CH_3$ | $CH_3$ | $CH_3$ | $CH_3$ | $(CH_2)_4$ | Cl | $C_6H_6$ | R.T. | 48 | 0.07 | Do. |
| 8 | $(CH_2)_2$ | $CH_3$ | $CH_3$ | $CH_3$ | $CH_3$ | $(CH_2)_4$ | Cl | $CH_3OH$ | Reflux | 0.5 | 0.08 | Do. |
| 9 | $(CH_2)_2$ | $CH_3$ | $CH_3$ | $CH_2CH_2$ | $CH_2CH_2$ | $CH_2C=CCH_2$ | Cl | $HCON(CH_3)_2$ | R.T. | 2 | 0.12 | Do. |
| 10 | $(CH_2)_2$ | $CH_3$ | $CH_2CH_2$ | $CH_2CH_2$ | $CH_2CH_2$ | $(CH_2)_{10}$ | Cl | $C_6H_6$ | R.T. | 48 | 0.10 | Do. |
| 11 | $(CH_2)_2$ | $CH_3$ | $CH_2CH_2$ | $CH_2CH_2$ | $CH_2CH_2$ | $(CH_2)_4$ | Cl | $C_6H_6$ | R.T. plus reflux | 3 | 0.12 | Do. |
| 12 | $(CH_2)_2$ | $CH_3$ | $CH_3$ | $CH_3$ | $CH_3$ | $(CH_2)_4$ | Cl | $CH_3COCH_3$ | 15 | 48 | 0.09 | Do. |
| 13 | $(CH_2)_3$ | $CH_3$ | $CH_3$ | $CH_3$ | $CH_3$ | $(CH_2)_4$ | Cl | $C_6H_5CH_3$ | 60 | 0.5 | 0.22 | Do. |
| 14 | $(CH_2)_3$ | $CH_3$ | $CH_3$ | $CH_3$ | $CH_3$ | $(CH_2)_4$ | Cl | $C_6H_5:CH_3OH$ (9:1) | R.T. plus reflux | 10+0.5 | 0.13 | Do. |
| 15 | $(CH_2)_3$ | $CH_3$ | $CH_3$ | $CH_3$ | $CH_3$ | $CH_2CH=CHCH_2$ | Cl | $C_6H_5$ | do | 2+1 | 0.13 | Do. |
| 16 | $(CH_2)_3$ | $CH_3$ | $CH_3$ | $CH_3$ | $CH_3$ | 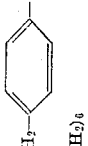 | Cl | $CHCl_3$ | do | 48+0.5 | 0.09 | Do. |
| 17 | $(CH_2)_3$ | $CH_3$ | $CH_3$ | $CH_3$ | $CH_3$ | $CH_2$—⌬—$CH_2$ | Cl | $C_6H_6$ | do | 48+5 | 0.21 | Do. |
| 18 | $(CH_2)_6$ | $CH_3$ | $CH_3$ | $CH_3$ | $CH_3$ | $(CH_2)_3$ | Cl | $C_6H_4(CH_3)_2$ | 100 | 1 | 0.14 | Light yellowish, white hygroscopic powder. |
| 19 | $(CH_2)_6$ | $CH_3$ | $CH_3$ | $CH_3$ | $CH_3$ | $(CH_2)_4$ | Cl | $C_6H_6$ | 40–50 | 1+0.5 | 0.23 | White hygroscopic powder. |
| 20 | $(CH_2)_6$ | $CH_3$ | $CH_3$ | $CH_3$ | $CH_3$ | $(CH_2CH_2O)_2CH_2CH_2$ | Cl | $C_6H_6$ | R.T. plus reflux | 3 | 0.16 | Do. |
| 21 | $(CH_2)_6$ | $CH_3$ | $CH_3$ | $CH_3$ | $CH_3$ | $CH_3CHCH_2CHCH_3$ | Cl | $C_6H_5:CH_3OH$ | do | | 0.12 | Do. |
| 22 | $CH_2$—⌬—$CH_2$ | $CH_3$ | $CH_3$ | $CH_3$ | $CH_3$ | $(CH_2)_4$ | Cl | $C_6H_6$ | do | 2+0.5 | 0.14 | Do. |
| 23 | $(CH_2)_6$ | $CH_3$ | $CH_3$ | $CH_3$ | $CH_3$ | $(CH_2CH_2O)_5CH_2CH_2$ | Cl | $C_6H_5$ | R.T. plus 50 | 3+0.5 | 0.17 | Do. |

[1] R.T. = Room temperature.
[2] Determined with a modified Ostwald's viscometer in 0.05M NaCl aqueous solution at a temperature of 24.7±0.02° C.

4. A novel polymer in accordance with claim 1, represented by the formula

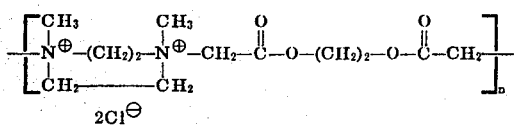

5. A novel polymer in accordance with claim 1 represented by the formula

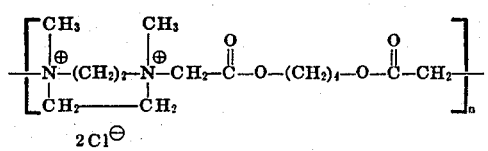

6. A novel polymer in accordance with claim 1 represented by the formula

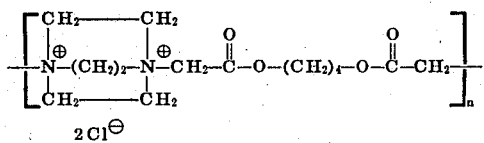

7. A novel polymer in accordance with claim 1 represented by the formula

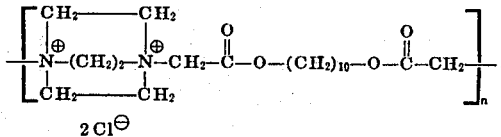

8. A novel polymer in accordance with claim 1 represented by the formula

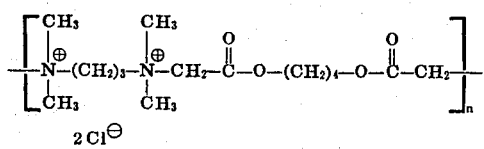

9. A novel polymer in accordance with claim 1, represented by the formula

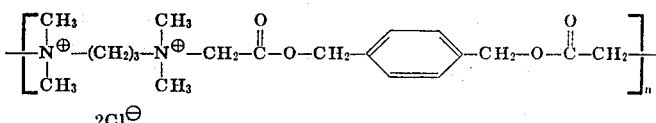

10. A novel polymer in accordance with claim 1, represented by the formula

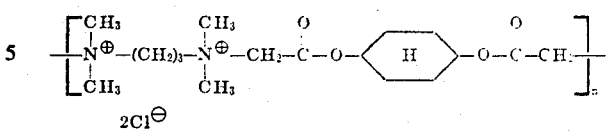

11. A novel polymer in accordance with claim 1 represented by the formula

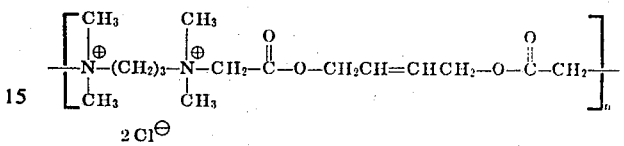

12. A novel polymer in accordance with claim 1 represented by the formula

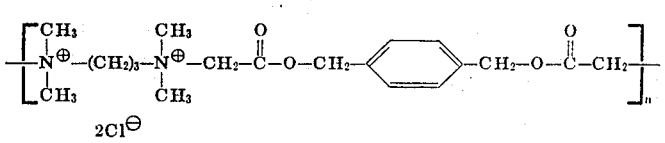

13. A novel polymer in accordance with claim 1 represented by the formula

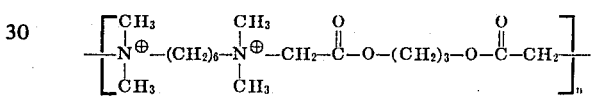

14. A novel polymer in accordance with claim 1 represented by the formula

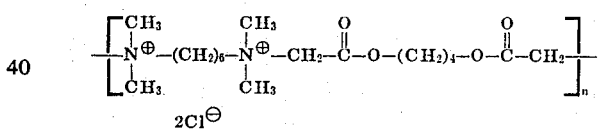

15. A novel polymer in accordance with claim 1 represented by the formula

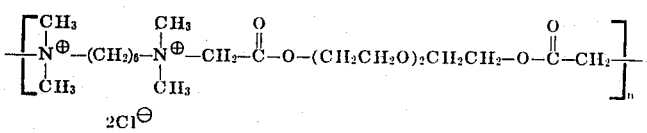

16. A novel polymer in accordance with claim 1 represented by the formula

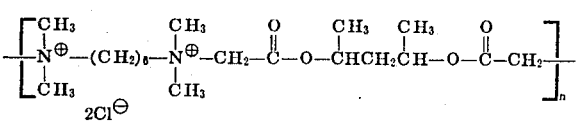

17. A novel polymer in accordance with claim 1 represented by the formula

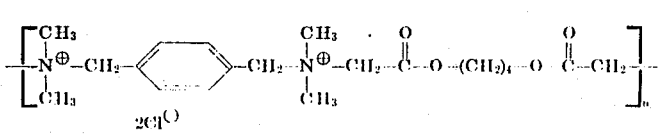

18. A novel polymer in accordance with claim 1 represented by the formula
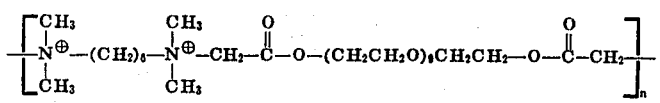
19. A clarifying agent for crude water in the reservoir for water supply, industrial water or turbid sewage or drainage water which comprises a polymer represented by the formula in accordance with claim 1.

UNITED STATES PATENT OFFICE
CERTIFICATE OF CORRECTION

Patent No. 3,671,468          Dated June 20, 1972

Inventor(s) Minoru TSUDA et al.

It is certified that error appears in the above-identified patent and that said Letters Patent are hereby corrected as shown below:

<u>Column 8,</u> lines 11-15, Claim 11, the formula should appear as shown below:

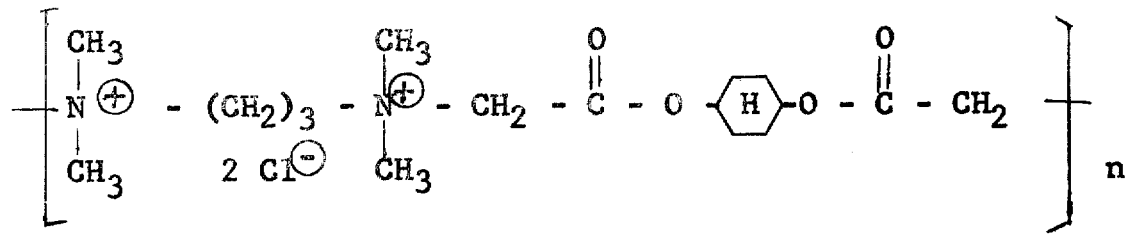

This certificate supersedes the Certificate of Correction issued June 26, 1973.

Signed and sealed this 30th day of April 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,671,468   Dated June 20, 1972

Inventor(s) Minoru TSUDA et al

It is certified that error appears in the above-identified patent and that said Letters Patent are hereby corrected as shown below:

Column 8, lines 3-8, Claim 10, the formula should appear as shown below:

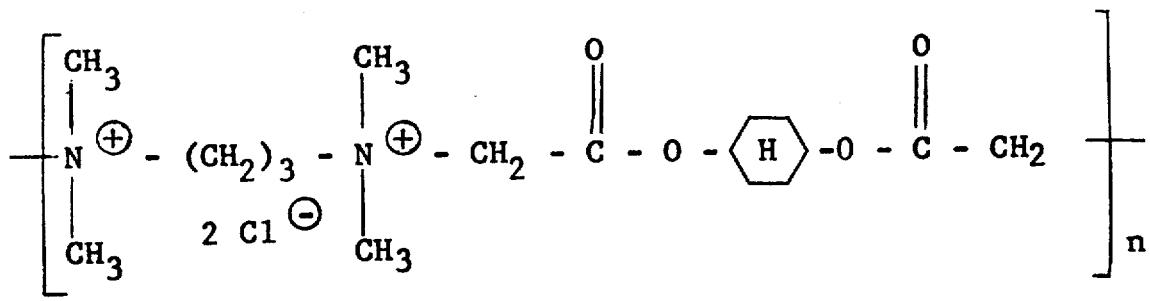

This certificate supersedes the Certificate of Correction issue April 30, 1974.

Signed and sealed this 15th day of October 1974.

(SEAL)
Attest:

McCOY M. GIBSON JR.
Attesting Officer

C. MARSHALL DANN
Commissioner of Patents